(12) United States Patent
Lyman et al.

(10) Patent No.: US 10,356,018 B2
(45) Date of Patent: Jul. 16, 2019

(54) USER MANAGEMENT METHODS AND SYSTEMS

(71) Applicant: Vivint, Inc., Provo, UT (US)

(72) Inventors: Jefferson Lyman, Alpine, UT (US); Nic Brunson, Salt Lake City, UT (US); Wade Shearer, Lehi, UT (US); Mike Warner, Payson, UT (US); Stefan Walger, Salt Lake City, UT (US)

(73) Assignee: Vivint, Inc., Provo, UT (US)

( * ) Notice: Subject to any disclaimer, the term of this patent is extended or adjusted under 35 U.S.C. 154(b) by 218 days.

(21) Appl. No.: 14/607,943

(22) Filed: Jan. 28, 2015

(65) Prior Publication Data

US 2015/0222578 A1 Aug. 6, 2015

Related U.S. Application Data

(60) Provisional application No. 61/934,151, filed on Jan. 31, 2014.

(51) Int. Cl.
*G06F 15/16* (2006.01)
*H04L 12/58* (2006.01)
*H04L 29/08* (2006.01)

(52) U.S. Cl.
CPC ............ *H04L 51/046* (2013.01); *H04L 67/04* (2013.01); *H04L 67/12* (2013.01); *H04L 67/125* (2013.01); *H04L 67/306* (2013.01)

(58) Field of Classification Search
USPC .................. 709/206, 205, 217, 218, 219
See application file for complete search history.

(56) References Cited

U.S. PATENT DOCUMENTS

| | | | | |
|---|---|---|---|---|
| 6,957,229 B1* | 10/2005 | Dyor | ................. | G06F 17/30873 |
| 9,288,280 B1* | 3/2016 | McKeon | ................. | H04L 67/18 |
| 2002/0069247 A1* | 6/2002 | Paknad | .................. | G06Q 10/10 |
| | | | | 709/204 |
| 2009/0157513 A1* | 6/2009 | Bonev | ............... | G06F 17/30029 |
| | | | | 705/14.69 |
| 2009/0285166 A1* | 11/2009 | Huber | ............... | G06Q 20/1235 |
| | | | | 370/329 |
| 2012/0197772 A1* | 8/2012 | Hing | ..................... | G06Q 30/04 |
| | | | | 705/34 |
| 2013/0074164 A1* | 3/2013 | Bartlett | ................... | G06F 21/31 |
| | | | | 726/5 |
| 2013/0151991 A1* | 6/2013 | Kimball | ............... | G06F 3/0481 |
| | | | | 715/753 |
| 2013/0209552 A1* | 8/2013 | Plakogiannis | ....... | A61K 9/0014 |
| | | | | 424/450 |
| 2014/0207611 A1* | 7/2014 | Cleary | ............... | G06Q 30/0633 |
| | | | | 705/26.8 |

(Continued)

*Primary Examiner* — Lan Dai T Truong
(74) *Attorney, Agent, or Firm* — Holland & Hart LLP

(57) ABSTRACT

Methods and systems are described for managing and adding user profiles to access an automation system. According to at least one embodiment, the computer-implemented method includes receiving a request to add a user to an automation system. The request is generated from one of a mobile computing device or an automation controller of the automation system. The method further includes receiving contact information for the user and generating a message to send to the user. The message includes an invitation to the automation system. The method also includes sending the message to the user.

19 Claims, 10 Drawing Sheets

(56) References Cited

U.S. PATENT DOCUMENTS

| | | | |
|---|---|---|---|
| 2014/0277597 A1* | 9/2014 | Le Sant | H04L 63/1433 700/17 |
| 2015/0112883 A1* | 4/2015 | Orduna | G06Q 50/265 705/325 |
| 2015/0331400 A1* | 11/2015 | Birgel | G05B 19/0426 700/86 |
| 2016/0283356 A1* | 9/2016 | Waldman | G06F 11/3672 |

* cited by examiner

USER MANAGEMENT METHODS AND SYSTEMS

CROSS REFERENCE

This application claims priority from U.S. Provisional Patent Application No. 61/934,151 entitled "USER MANAGEMENT METHODS AND SYSTEMS," which was filed 31 Jan. 2014, and assigned to the assignee hereof.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor and/or control an aspect of a home or business automation system. Adding new users or modifying users to automation systems can be cumbersome and time consuming.

SUMMARY

According to at least one embodiment, the computer-implemented method includes receiving a request to add a user to an automation system. The request is generated from one of a mobile computing device or an automation controller of the automation system. The method further includes receiving contact information for the user and generating a message to send to the user. The message includes an invitation to the automation system. The method also includes sending the message to the user.

In some embodiments, the contact information may be one of a mobile phone number and the message may be a SMS message. The method may further include prompting the user to download a mobile application associated with the automation system to a mobile computing device associated with the user. In further embodiments, the contact information may be an email address and the message may be an email. In some embodiments, the method may further include prompting the user to create an account with an automation system provider of the automation system and prompting the user to create a profile associated with the automation system. In some embodiments, the message may direct the user to a user interface associated with the automation system.

In some embodiments, the method may further comprise receiving information from the user to generate a profile for the automation system, wherein the information includes a unique identifier. The method may generate a profile associated with the automation system for the user. In some embodiments, the unique identifier may be a personal identification number. In further embodiments, the unique identifier may be a biometric identifier.

In some embodiments, the automation system may be associated with an automation system provider and the user may have an account with the automation provider. The method may then include adding a profile to the account wherein the profile is associated with the automation system.

According to another embodiment, an apparatus for adding a user to an automation system is also described. The apparatus may include a processor, a memory in electronic communication with the processor and instructions stored on the memory of the processor. The processor may execute the instructions to receive a request to add a user, receive contact information for the user, generate a message to send to the user, and send the message to the user. The request may be generated from one of a mobile computing device or an automation controller of the automation system. The message may include an invitation to the automation system.

In some embodiments, the automation controller may be a control panel. In further embodiments, the mobile computing device may be a smart phone and may comprise an application to interface with the automation system.

According to another embodiment, a computer-program product for adding a user profile to an automation system is described. The computer-program product may include a non-transitory computer-readable medium that may store instructions executable by a processor. The instructions may receive a request to add the user, receive contact information for the user, generate a message to send to the user, and send the message to the user. The request may be generated from one of a mobile computing device or an automation controller of the automation system. The message may include an invitation to the automation system.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
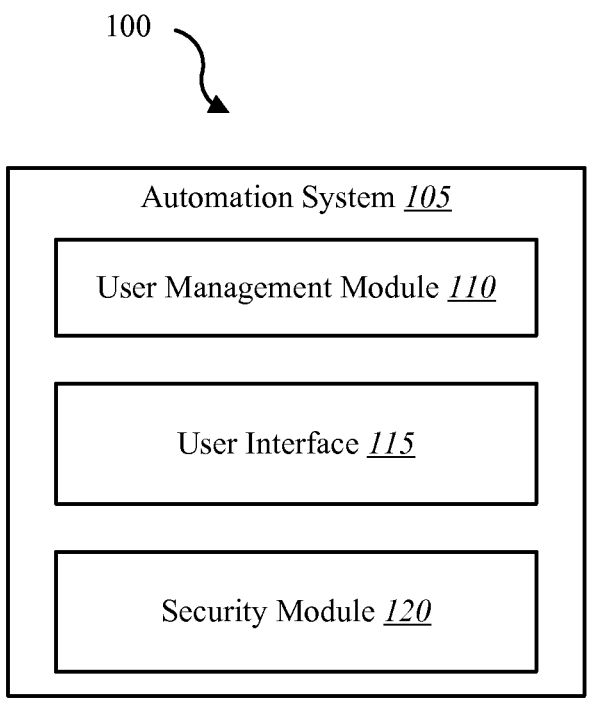
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. More specifically, the systems and methods described herein relate to an improved user management system for automation systems. The user management system may enable the management of different user profiles associated with the automation system.

An automation system may have an owner, administrator or other authoritative figure (generally referred to herein as "administrator") of the system. The administrator may control the level of access to the automation system for different users. A user of an automation system may be a person with access to the automation system. A user profile may define the user's access to the system. Different users may have various levels of access. Administrators may control and manage the users and associated user profiles of the automation system.

For example, in some embodiments, the administrator may create a user profile enabling a user to access the automation system. A user may have a limited user profile restricting access to select parts, components, systems, or various aspects of the automation system. For example, a user may have a user profile limiting access to a security system. The user profile may further be limited to only allow the user to arm and disarm the security system. In still further embodiments, the user profile may limit the access to a security system by limiting which doors, zones, etc. the user may control (e.g., a user may only be allowed access to a garage of a residential building and/or not be allowed to access a main office of a commercial building). The ability to create, modify, and customize user profiles enables the administrator to customize the automation system (i.e., security system) to suit their needs and/or situation.

FIG. 1 is a block diagram illustrating one embodiment of an environment 100 in which the present systems and methods may be implemented. In some embodiments, the systems and methods described herein may be performed at least in part on or using an automation system 105. The environment 100 may include the automation system 105, a user management module 110, a user interface 115 and a security module 120.

User management module 110 may be configured to receive data related to managing user profiles. In one example, managing a user profile may relate to creating, modifying, and/or deleting a user profile. This may enable an administrator of the automation system 105 to control and manage the user profiles associated with the automation system 105. For example, the administrator may be able to create, edit, delete, modify a user's access to all or a part of the features provided by the automation system 105 by modifying, deleting, or creating a user profile. The user management module 110 may enable the administrator to define pre-set profiles to assign to new users or may allow the administrator to customize the user profile.

User interface 115 may allow a user and/or administrator to interact with the automation system 105. The user interface 115 may facilitate communication between the user and the automation system 105. For example, in some embodiments, the automation system 105 may include a security system. Security system may be controlled via the security module 120. In some embodiments, a user may access the security module 120 and activate a security system via the user interface 115.

Figure 2:
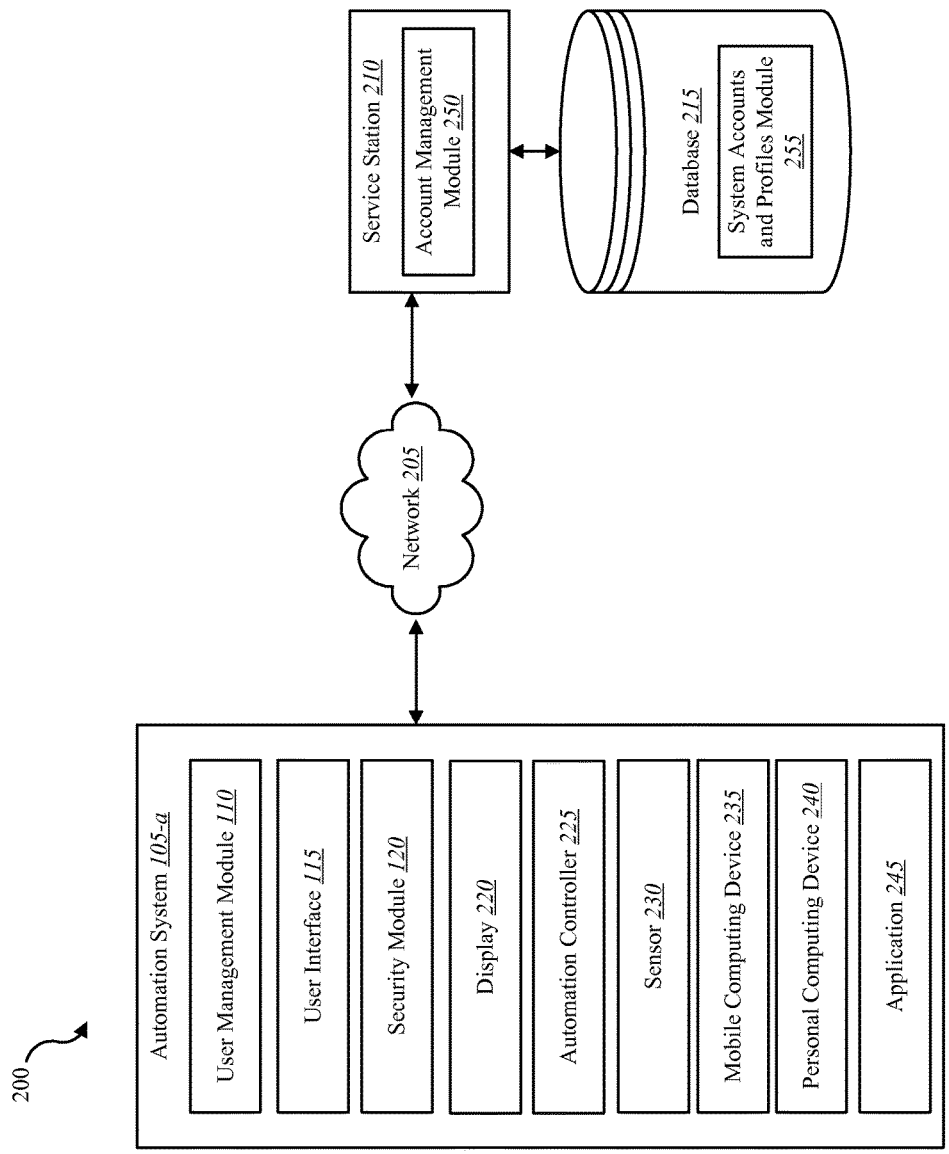
FIG. 2 is a block diagram of another environment in which the present systems and methods may be implemented.

Referring now to FIG. 2, in some embodiments, an environment 200 may include the components of environment 100 described above, and may further include a network 205, a service station 210 and a database 215. Additionally, environment 200 may include an automation system 105-*a*, which may be one example of the automation system 105 described above with reference to FIG. 1. Automation system 105-*a* may additionally include a display 220, an automation controller 225, a sensor 230, a mobile computing device 235, a personal computing device 240, and an application 245. The automation system 105-*a* may include various components and functionality that work cooperatively with user management module 110 and user interface 115, and/or may operate independently of user management module 110 and user interface 115.

Sensor 230 shown in FIG. 2 may represent one or more separate sensors or a combination of two or more sensors in a single sensor device. For example, sensor 230 may represent one or more camera sensors and one or more motion sensors connected to environment 200. Additionally, or alternatively, sensor 230 may represent a combination sensor such as both a camera sensor and a motion sensor integrated in the same sensor device. Although sensor 230 is depicted as connecting directly to automation system 105-*a*, in some embodiments, sensor 230 may connect to the automation system 105-*a* over network 205. Additionally, or alternatively, sensor 230 may be integrated with a home appliance or fixture such as a light bulb fixture. Sensor 230 may include an accelerometer to enable sensor 230 to detect a movement. Sensor 230 may include a wireless communication device enabling sensor 230 to send and receive data and/or information to and from one or more devices in environment 200. Additionally, or alternatively, sensor 230 may include a GPS sensor to enable sensor 230 to track a location of sensor 230. Sensor 230 may include a proximity sensor to enable sensor to detect proximity of a person relative to a predetermined distance from a dwelling (e.g., geo-fencing). Sensor 230 may include one or more security detection sensors such as, for example, a glass break sensor, a motion detection sensor, or both. Additionally, or alternatively, sensor 230 may include a smoke detection sensor, a carbon monoxide sensor, or both.

In some embodiments, the mobile computing device 235 may include one or more processors, one or more memory devices, and/or a storage device. Examples of the mobile computing device 235 may include mobile phones, smart phones, tablets, personal digital assistants (PDAs), wearable computers, ultra-mobile PCs, etc. Although the mobile computing device 235 is depicted as connecting directly to automation system 105-a, in some embodiments, the mobile computing device 235 may connect to the automation system 105-a over the network 205. Additionally, the mobile computing device 235 may represent a single mobile computing device or multiple mobile computing devices that may access the automation system 105-a.

In some embodiments, the personal computing device 240 may include one or more processors, one or more memory devices, and/or a storage device. Examples of the personal computing device 240 may include a viewing device associated with a media content set top box, satellite set top box, cable set top box, DVRs, personal video recorders (PVRs), personal computing devices, computers, servers, etc. Although the personal computing device 240 is depicted as connecting directly to automation system 105-a, in some embodiments, the personal computing device 240 may connect to the automation system 105-a over the network 205. Additionally, the personal computing device 240 may represent a single personal computing device or multiple personal computing devices that may access the automation system 105-a.

In some embodiments, a user may access the functions of automation system 105-a from either the mobile computing device 235 or the personal computing device 240. For example, in some embodiments, user may have a user profile associated with the automation system 105-a and may access the system via the mobile computing device 235 or the personal computing device 240. In some embodiments, the mobile computing device 235 may include a mobile application interfacing with one or more functions of the automation system 105-a, and the service station 210.

Examples of the automation controller 225 may include a dedicated automation computing device. Examples of a dedicated computing device may include a wall-mounted controller, a remote control, a voice activated controller, and the like. In some embodiments, the automation controller 225 may control aspects of a property as well as to receive and display notifications regarding monitored activity of a property.

In some embodiments, the application 245 may allow a user to control (either directly or via automation controller 225) an aspect of the monitored property based on the user profile, including security, energy management, locking or unlocking a door, checking the status of a door, locating a person or item, controlling lighting, thermostat, cameras, receiving notification regarding a current status or anomaly associated with a home, office, place of business, and the like. In some configurations, the application 245 may enable the automation system 105-a to interface with the automation controller 225 and enable the user interface 115 to display automation, security, and/or user management content on the display 220, the mobile computing device 235 and/or the personal computing device 240. Further, the application 245 may be installed on the mobile computing device 235 and/or on the personal computing device 240 to allow a user to interface with the automation system 105-a and the service station 210.

In some embodiments, the automation system 105-a may communicate with the service station 210 via the network 205. Examples of the network 205 include cloud networks, local area networks (LAN), wide area networks (WAN), virtual private networks (VPN), wireless networks (using 802.11, for example), and/or cellular networks (using 3G and/or LTE, for example), etc. The network 205 may be a single network, or may include multiple interconnected, overlapping, or coincidental networks. For example, in some embodiments, the network 205 may include multiple networks interconnected to facilitate communication or may include redundant networks. For example, the network 205 may represent a first network (e.g., the Internet) and a second network (e.g., cellular networks).

The service station 210 shown in FIG. 2 may represent one or more separate service stations or a combination service stations. The service station 210 may be a network operations center, a monitoring center, a service station or any similar station in association with the automation system service provider. In some embodiments, the service station 210 may include an account management module 250. The account management module 250 may manage an automation account and user profiles associated with the environment 200.

In some embodiments, the service station 210 may be coupled to the database 215. The database 215 may include, for example, system accounts and profiles associated with each automation system 105-a monitored by the service station 210. For example, the database 215 may include a system account and profile module 255 which may store the user accounts and profiles associated with each automation system 105-a. The database 215 may include other information including, for example, historical information about automation system 105-a and other aspects of environment 200, contact information for various response personnel, and the like.

Figure 3:
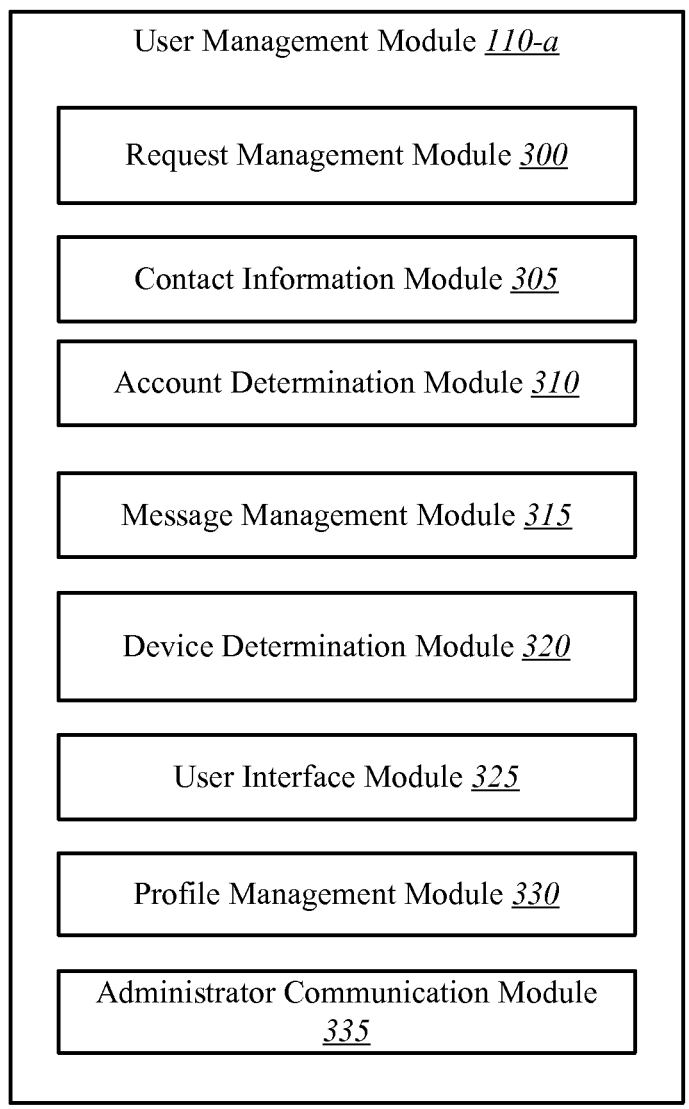
FIG. 3 is a block diagram of an example user management module of the environments shown in FIGS. 1 and 2.

FIG. 3 is a block diagram illustrating one example of a user management module 110-a. The user management module 110-a may be one example of user management module 110 depicted in FIGS. 1 and/or 2. As depicted, the user management module 110-a may include a request management module 300, a contact information module 305, an account determination module 310, a message management module 315, a device determination module 320, a user interface module 325, a profile management module 330, and an administrator communication module 335. The user management module 110-a may include additional modules and capabilities in other embodiments. Similarly, user management module 110-a may include a fewer number of modules and functionality than that which is described with reference to FIG. 3. User management module 110-a may allow an administrator of an automation system 105 to change, edit, update, add or otherwise manage user profiles associated with the automation system.

In some embodiments, the request management module 300 may receive a request from an administrator to modify or add a user to the automation system 105. The request management module 300 may receive the request and determine if it modifies or adds a new user. If the request adds a new user, request management module 300 may receive information depicting the user profile. For example, the request management module 300 may receive information detailing the user's level of access to the automation system.

Alternatively or additionally, user management module 110-a may determine the request modifies an existing user. As a result, user management module 110-a may receive information depicting the changes to the user profile. Examples of changes may include increasing or decreasing access to the automation system, or in some instances, deleting the user profile and preventing the user from accessing the system all together.

The contact information module 305 may receive and analyze data relating to a new or existing user. For example, contact information module 305 may receive a name of the user and their contact information. The contact information may include a mobile device number, a landline number, a mailing address (e.g. a street address), an email address and the like. The contact information module 305 may also determine a preferred mode of contacting the user. For example, the contact information module may determine an email is the preferred method of contacting a new user.

The account determination module 310 may receive contact information from the contact information module 305. The account determination module 310 may then search a system profile database (e.g., system accounts and profiles module 255) to determine if the user has an existing account and/or profile with the automation service provider. For example, the account determination module may use either the user's name and/or contact information to determine if an existing account contains the same or similar information.

In some embodiments, the account determination module may receive information indicating the user already has account. In that instance, the account determination module 310 may confirm the details of the user's account. For example, the account determination module 310 may use the account information to search a database (e.g., system accounts and profiles module 255) and confirm the account information and status.

Figure 4:
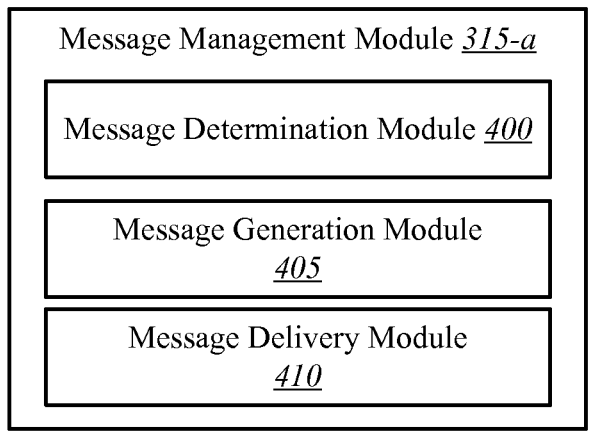
FIG. 4 is a block diagram of an example message management module of the environment shown in FIG. 3.

One example of the message management module 315 is illustrated in FIG. 4. As depicted, message management module 315-a may include message determination module 400, message generation module 405, and message delivery module 410. Message determination module 400 may receive information from the contact information module 305 and the account determination module 310 to determine the type and content of a message to send to a new user. The type of message may be one of an SMS message, an email, a phone call, or the like. For example, if the contact information is a mobile number, the message determination module 400 may determine to send an SMS message. In further embodiments, if the contact information is an email, the message determination module 400 may determine to send an email message. The content of the message may include an invitation to create an account and profile associated with the automation system and/or information identifying the automation system. For example, the message may include the name of a business or commercial customer associated with the automation system, an address, the name of the administrator, and/or the like.

In some embodiments, the message generation module 405 may generate the message to send to the user. For example, the message generation module 405 may receive information from the message determination module 400 and generate the type of message determined in the message determination module 400. The message generation module 405 may also populate the message with the content determined by the message generation module 405.

In some embodiments, the message delivery module 410 may deliver the message generated by a message generation module 405. For example, message delivery module 410 may receive the contact information from the contact information module 305. The message delivery module 410 may also receive the message from the message generation module 405. The message delivery module 410 may deliver the message to the new user. In some embodiments, the message may be sent from the administrator of the automation system. In further embodiments, the message may be sent from a service station associated with the automation system and may include the name of the administrator and an address associated with the automation system.

Referring back to FIG. 3, the device determination module 320 may determine a type of device the user is using. For example, device determination module 320 may determine the user is on a mobile computing device or personal computing device. (e.g., mobile computing device 235, personal computing device 240). The device determination module 320 may communicate the device information to the user interface module 325 to customize the user experience based on their device.

Figure 5:
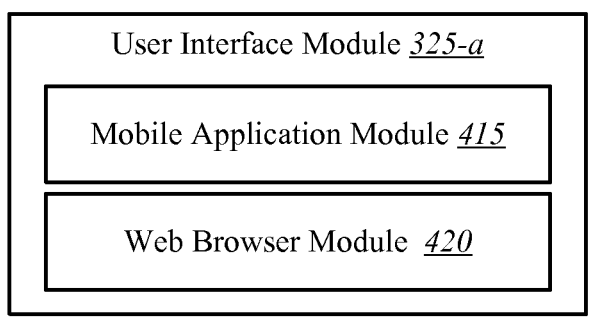
FIG. 5 is a block diagram of an example user interface module of the environment shown in FIG. 3.

One example of a user interface module 325 is illustrated in FIG. 5. As depicted, user interface module 325-a may include a mobile application module 415 and a web browser module 420. In some embodiments, the user interface module 325-a may receive information from the device determination module 320 informing the user interface module 325-a the type of device the user is using. The user interface module 325-a may trigger either the mobile application module 415 or the web browser module 420 depending on the type of device the user is using.

For example, if a user is on a mobile computing device, the device determination module 320 may trigger the mobile application module 415. The mobile application module 415 may be a mobile application installed on the user's mobile computing device. The application may interface with the automation system (e.g., automation system 105) or may interface with a service station associated with a provider of the automation system (e.g., service station 210). In some embodiments, the user may not have the application installed on their mobile computing device. The mobile application module 415 may prompt the user to download the application to their device.

In some instances, the user may not download or have the application on their device. The mobile application module 415 may trigger the web browser module 420 to interface with the user. The web browser module 420 may also interface with the user from personal computing devices. Web browser module 420 may include a web page associated with the automation system. The web page may be accessed via a web application from the personal computing device, or in some instances, the mobile computing device.

Referring back to FIG. 3, the profile management module 330 may interact with the user and the automation system to generate or modify a profile associated with the automation system. For example, the profile management module 330 may collect data to create a user profile. Examples of information collected may include name, contact information, unique identifier, profile details, or the like. In some embodiments, the profile management module 330 may confirm information provided by the administrator, for example contact information collected by the contact information module 305.

The profile management module 330 may further collect information to uniquely identify the user. For example, in some embodiments, an automation system (e.g., automation system 105) may require a code or password to access the system. The code or password, in some instances, may be a generic code or password. In other embodiments, the code may be unique to the user. For example, the user profile may have a unique identifier allowing access the automation system. The automation system may recognize the unique password and grant the user access according to the user profile. As a result, in some embodiments, the profile management module 330 may request the user to generate a unique identifier. The unique identifier may be an alphanumeric identifier, a numeric password (e.g., a PIN), a biometric identifier, or the like. For example, the automation system may scan and recognize a finger print or a thumbprint, or may be equipped with voice recognition software that uniquely identifies a user's voice. Other methods of uniquely identifying a user may be used, the examples provided herein are in no way intended to be limiting.

Figure 6:
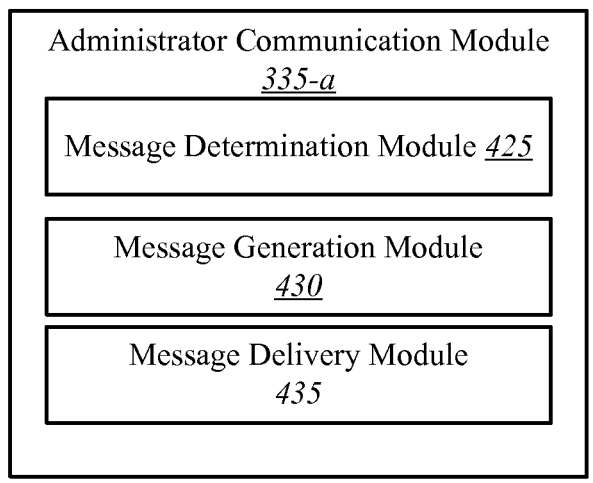
FIG. 6 is a block diagram of an example administrator communication module of the environment shown in FIG. 3.

One example of an administrator communication module 335 is illustrated in FIG. 6. As depicted, the administrator communication module 335-a may include a message determination module 425, a message generation module 430, and a message delivery module 435. The message determination module 425 may determine the type and content of a message to communicate to an account administrator. The types of messages may include email, SMS message, a message delivered to an automation controller (e.g., automation controller 225), a phone call, or any other type of message able to convey information. The content of the message may include a status of the invitation sent to the new user. For example, the message may communicate an invitation was sent to a new user, a new user was added to an automation system, a user profile was modified, or a potential user declined to accept an invitation, among other information.

The message generation module 430 may generate the message to send to the administrator, which the message delivery module 435 may deliver. For example, in some embodiments, the message generation module 430 may communicate and/or receive a request from the message determination module 425 to generate the message. The message delivery module 435 may then deliver the message. In some embodiments, the message delivery module 435 may deliver the message via one of an SMS message, an email, a phone, a letter, or may use any alternative communication channels.

Figure 7:
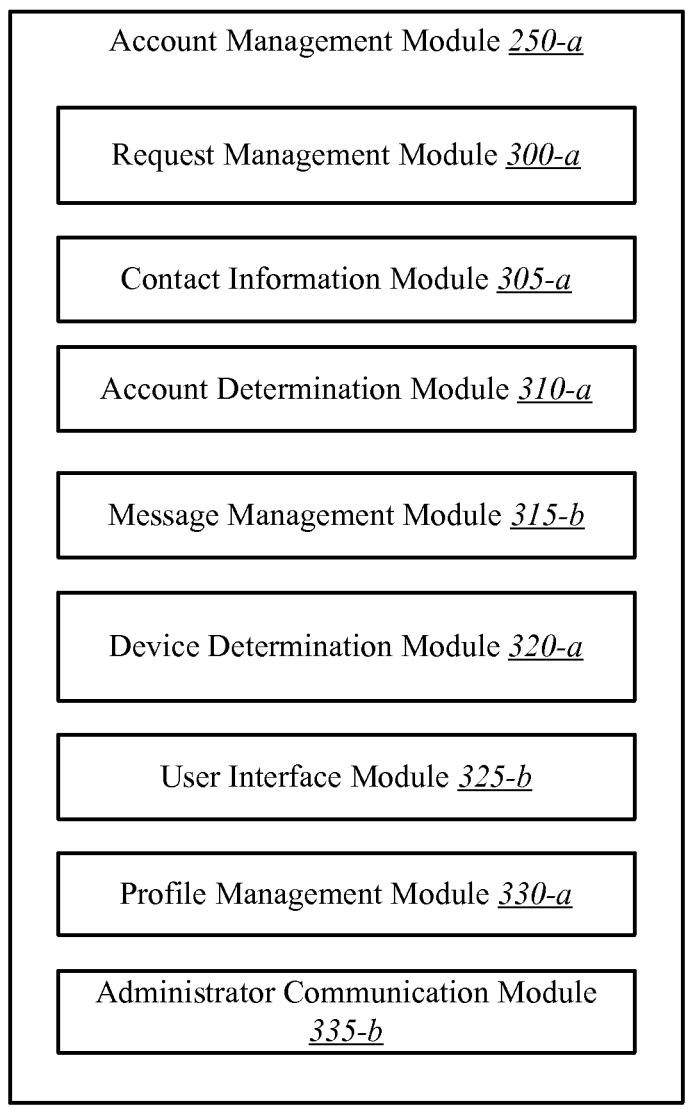
FIG. 7 is a block diagram of an example account management module of the environment shown in FIG. 2.

FIG. 7 is a block diagram illustrating one example of an account management module 250-a. Account management module 250-a may be one example of the account management module 250 depicted in FIG. 2. As depicted, the account management module 250-a may include a request management module 300-a, a contact information module 305-a, an account determination module 310-a, a message management module 315-b, a device determination module 320-a, a user interface module 325-b, a profile management module 330-a, and an administrator communication module 335-b. In some embodiments, the modules 300 through 330 may be examples of the modules 300-330 illustrated in FIGS. 3, 4, 5, and/or 6. The modules 300-330 may be located in either or both the user management module 110 or the account management module 250-a.

In some embodiments, the user management module 110 and the account management module 250-a may cooperate to achieve similar end results. For example, parts of the embodiments enclosed herein may be performed in the user management module 110 and parts may be performed in the account management module 250-a. In still further embodiments, either the user management module 110 or the account management module 250-a may perform the method of managing a user profile.

Figure 8:
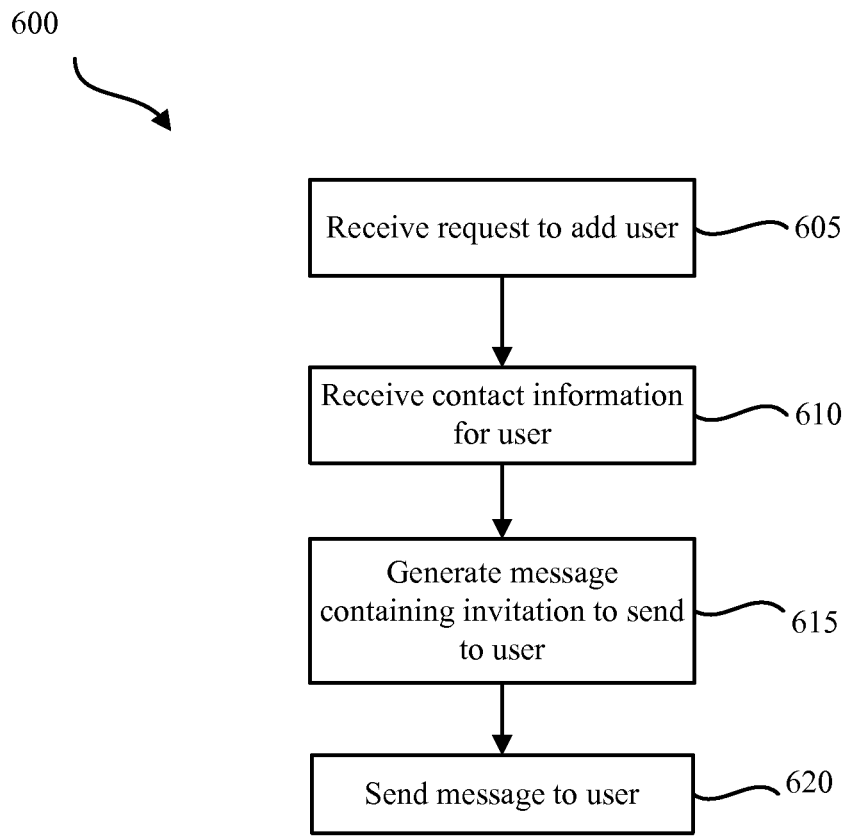
FIG. 8 is a flow diagram illustrating a method for adding a user to an automation system.

FIG. 8 is a flow diagram illustrating one embodiment of a method 600 for adding a new user profile for an automations system. In some configurations, the method 600 may be implemented in whole or in part by the user management module 110 of the automation system 105 shown in FIGS. 1 and/or 2. In further configurations, the method 600 may be implement in whole or in part by the account management module 250 shown in FIGS. 2 and/or 7. In still further embodiments, the method 600 may be performed generally by the automation system 105 shown in FIGS. 1 and/or 2, or even more generally by the environments 100, 200 shown in FIGS. 1 and/or 2.

At block 605, the method 600 may receive information to add a user to the automation system. At block 610, the contact information for the user may be received. At block 615, a message may be generated that contains an invitation to send to the user. At block 620, the generated message may be sent to the user.

In some embodiments, at block 605, the request may be generated by an administrator of the automation system. The request may be generated from one of a automation controller, a mobile computing device or a personal computing device. For example, the administrator may enter information into a control panel of the automation system. In other embodiments, the administrator may use an application on their mobile computing device to generate the request. In still further embodiments, the administrator may generate a request using a web application on their personal computing device.

The request in block 605 may be received by the user management module 110 or the account management module 250 or both. For example, in some embodiments, the administrator may generate a user profile request while remote from the automation controller. Using a mobile computing device, the administrator may access an application associated with the automation service provider to generate a request to add or modify a user profile. The request may be communicated to the automation controller, or in some instances, the request may be communicated to a service station (e.g., service station 210).

At block 615, a message may be generated to send to the new user. The message may include an invitation to become a new user of the automation system. In some embodiments, the message may include instructions on how to generate a user profile. The instructions may be a hyperlink directing the user to a document, application or webpage with instructions or prompts to create a user profile. The message may further include information identifying the administrator and/or the environment containing the automation system. In some embodiments, the message may be generated by a message management module or a message generation module (e.g., message management module 315, message generation module 405).

At block 620, the message may be sent to the user. The message may be sent via SMS message, email, phone call, letter or the like. The message may be sent by a message management module or a message delivery module (e.g., message management module 315, message generation module 405).

Figure 9:
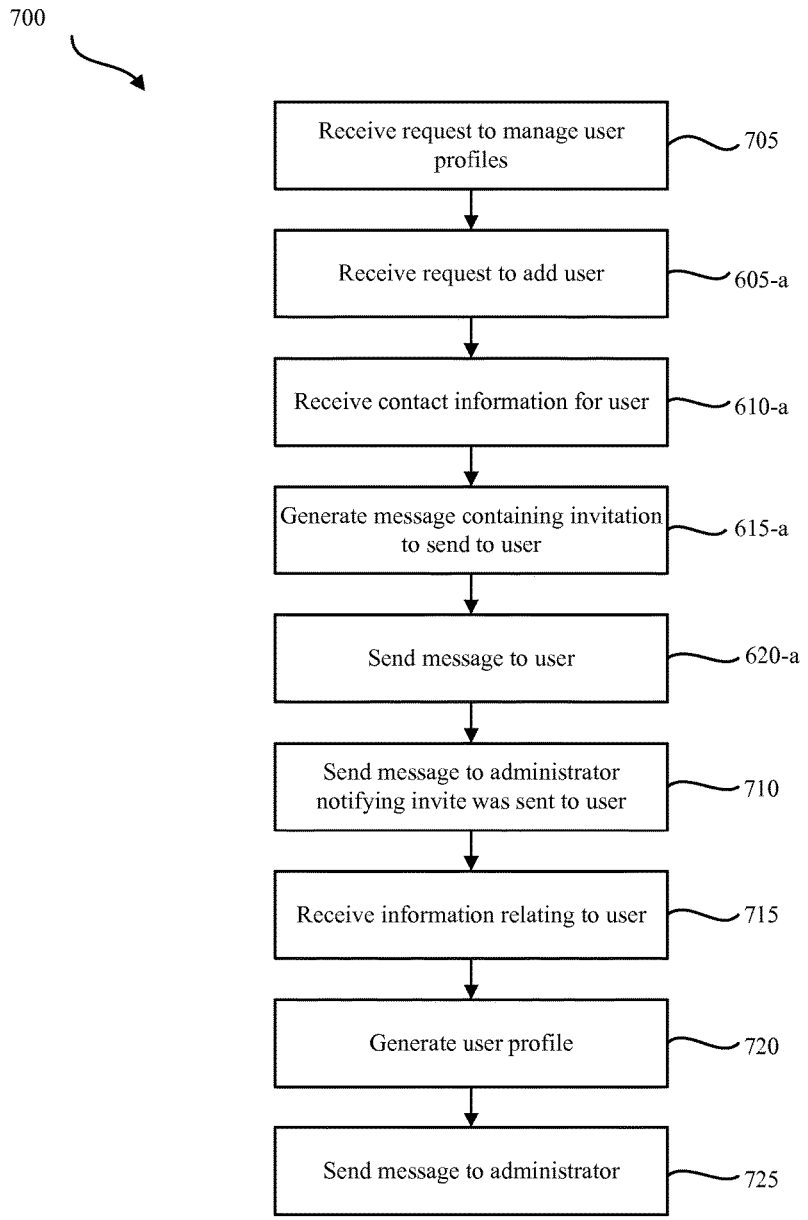
FIG. 9 is a flow diagram illustrating another method for adding a user to an automation system.

FIG. 9 is a flow diagram illustrating one embodiment of a method 700 for adding a user to an automation system. In some configurations, the method 700 may be implemented in whole or in part by the user management module 110 of the automation system 105 shown in FIGS. 1 and 2. In further configurations, the method 700 may be implemented in whole or in part by the account management module 250 shown in FIGS. 2 and/or 7. In still further embodiments, method 700 may be performed generally by automation system 105 shown in FIGS. 1 and/or 2, or even more generally by the environments 100, 200 shown in FIGS. 1 and/or 2.

At block 705, the method may receive a request to manage user profiles. The request may be generated from an administrator of the automation system. The administrator may use one an automation controller, mobile computing device, or personal computing device (e.g., automation controller 225, mobile computing device 235, personal computing device 240 to generate the request). In some embodiments, the mobile computing device may include an application which may generate the request.

At block 605-*a*, the method 700 may receive information to add a user to the automation system. At block 610-*a*, the contact information for the user may be received. At block 615-*a*, a message may be generated that contains an invitation to send to the user. At block 620-*a*, the generated message may be sent to the user. Blocks 605-*a* through 620-*a* may be examples of blocks 605-620 described above with reference to FIG. 13.

At block 710, a message may be sent to the administrator notifying them that the message containing the invitation was sent to the new user. The message may be one of an SMS message, an email, a phone, a letter, or the like. The message may be generated and sent via an administrator communication module (e.g., administrator communication module 335).

At block 715, information relating to the new user may be received. For example, at block 715, the contact information provided in block 610-*a* may be confirmed. At block 715, a unique identifier may be received from the user. Other information received may include a preferred contact method, information indicating the user already has an account with the automation service provider, or any other information helpful in generating a new user profile.

At block 720, a new user profile for the system may be generated. Once the new user profile is generated, the user may be able to access the automation system. The user may receive a message indicating their profile is active immediately, or there may be a delay before their profile is activated. In some embodiments, the administrator may need to validate or confirm the user profile before the user profile is activated.

At block 725, a message may be sent to the administrator. The message may communicate that a new user profile was generated with access to their automation system. The message may require the administrator to authorize and approve the user profile. The message may be one of an SMS message, an email, a phone, a letter, or the like. The message may be generated and sent via an administrator communication module (e.g., administrator communication module 335).

In some embodiments, method 700 may include additional or alternative steps. For example, in some embodiments, the administrator may send a request to manage user from the automation controller. The user may be with the administrator at the automation controller. Rather than sending the new user an invitation to the system, the user may use the automation controller to generate their user profile.

Figure 10:
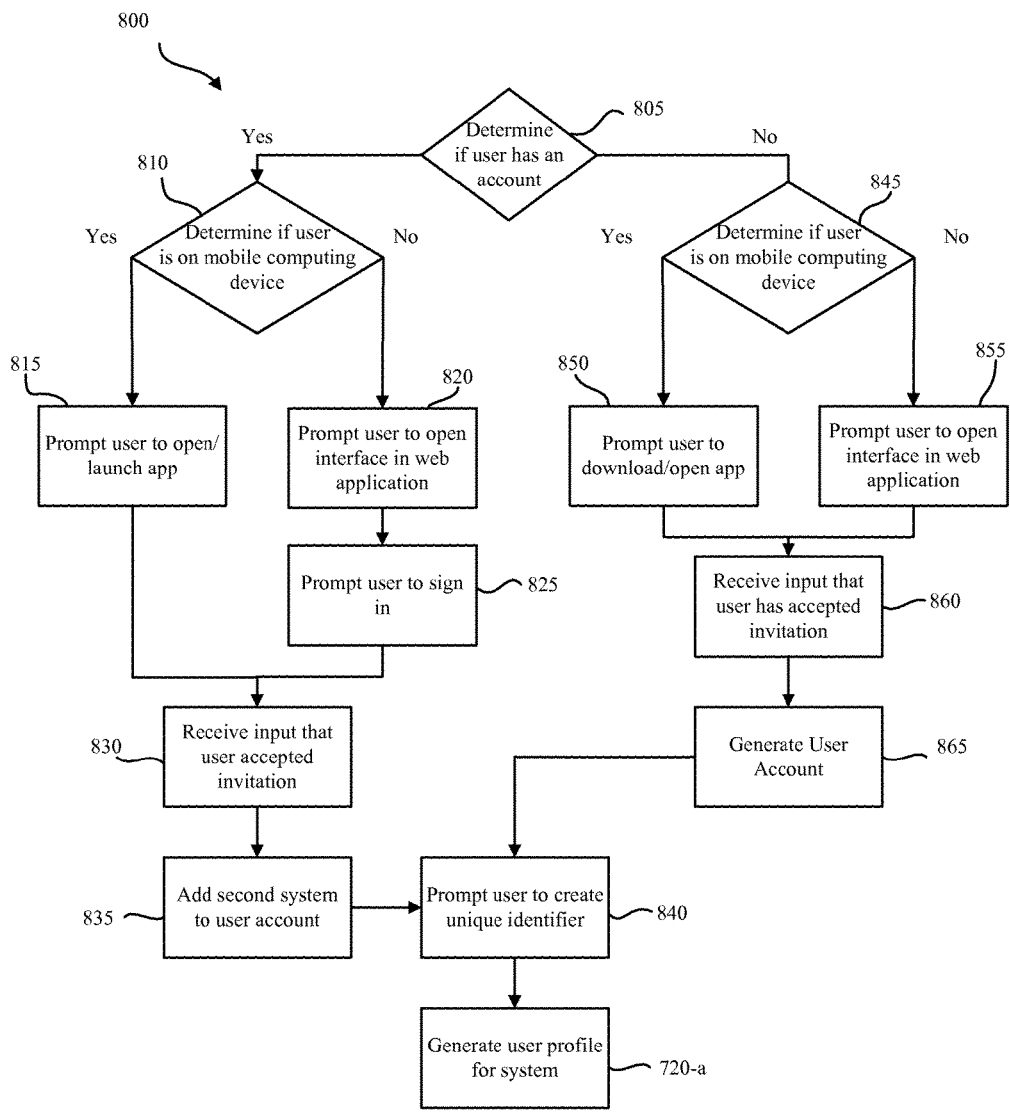
FIG. 10 is a flow diagram illustrating another method for adding a user to an automation system.

FIG. 10 is a flow diagram illustrating one embodiment of the method 800 for generating a new user profile. In some configurations, the method 800 may be implemented in whole or in part by the user management module 110 of the automation system 105 shown in FIGS. 1 and 2. In further configurations, the method 800 may be implement in whole or in part by the account management module 250 shown in FIGS. 2 and/or 7. In still further embodiments, method 800 may be performed generally by automation system 105 shown in FIGS. 1 and/or 2, or even more generally by the environments 100, 200 shown in FIGS. 1 and/or 2. In some embodiments, the sequence of events in method 800 may be interchanged or may be intermingled with the events of method 700 or method 600.

At block 805, information that the user has an account may be received. For example, the user may already have an account associated with automation system provider. The account may be associated with a separate and/or different automation system. If the user has an account, at block 810, information may be received determining if the user is on a mobile computing device. If the user is on a mobile computing device, at block 815, the user may be prompted to open and/or launch an application associated with the automation system provider. If the user is not on a mobile computing device, at block 820, the user may be prompted to open an interface in a web application, for example, a web browser. At block 825, the user may be prompted to sign into their account via the web application.

Whether the user interfaces with the automation system provider via the mobile application or the web application, at block 830, information that the user has accepted the invitation may be received. Once the user has accepted the invitation, at block 835, the user may be prompted to add an additional system to their account. At block 840, the user may be prompted to create a unique identifier. In some embodiments, if the user has an account with the automation system provider, the user already have a unique identifier and may not need to create a new one. By accepting the invitation, the user may access the automation system using their existing unique identifier. In these embodiments, the method 800 may proceed from block 835 to block 720-*a*. At block 720-*a*, a user profile for the system may be generated. Block 720-*a* may be one example of block 720 described above with reference to FIG. 9.

If the user does not have an account with a provider of the automation system, at block 845, information may be received determining if the user is on a mobile computing device. If the user is using a mobile computing device, at block 850, the user may be prompted to download or open an application associated with the provider. If the user is not on a mobile computing device, at block 855, the user may be prompted to open an interface in a web application.

At block 860, information may be received that the user has accepted the invitation. At block 865, a user account may be generated. Once the new user has an account, at block 840, the user may be prompted to create a unique identifier. At block 720-*a*, a user profile for the system may be generated.

In some embodiments, the method 800 may include additional steps. For example, if a user declines to access or download a mobile application, the user may be prompted to open an interface in a web application (e.g., block 815 or block 850). In further embodiments, the user may be prompted to confirm the contact information received. For example, the user may need to confirm the contact information provided to the system by the administrator is accurate. In some instances, the user may change the contact information. In further embodiments, the method may include receiving a preferred contact method form the user. For example, the user may prefer to only receive text messages, or, in some embodiments, the user may wish to speak with a customer representative.

Figure 11:
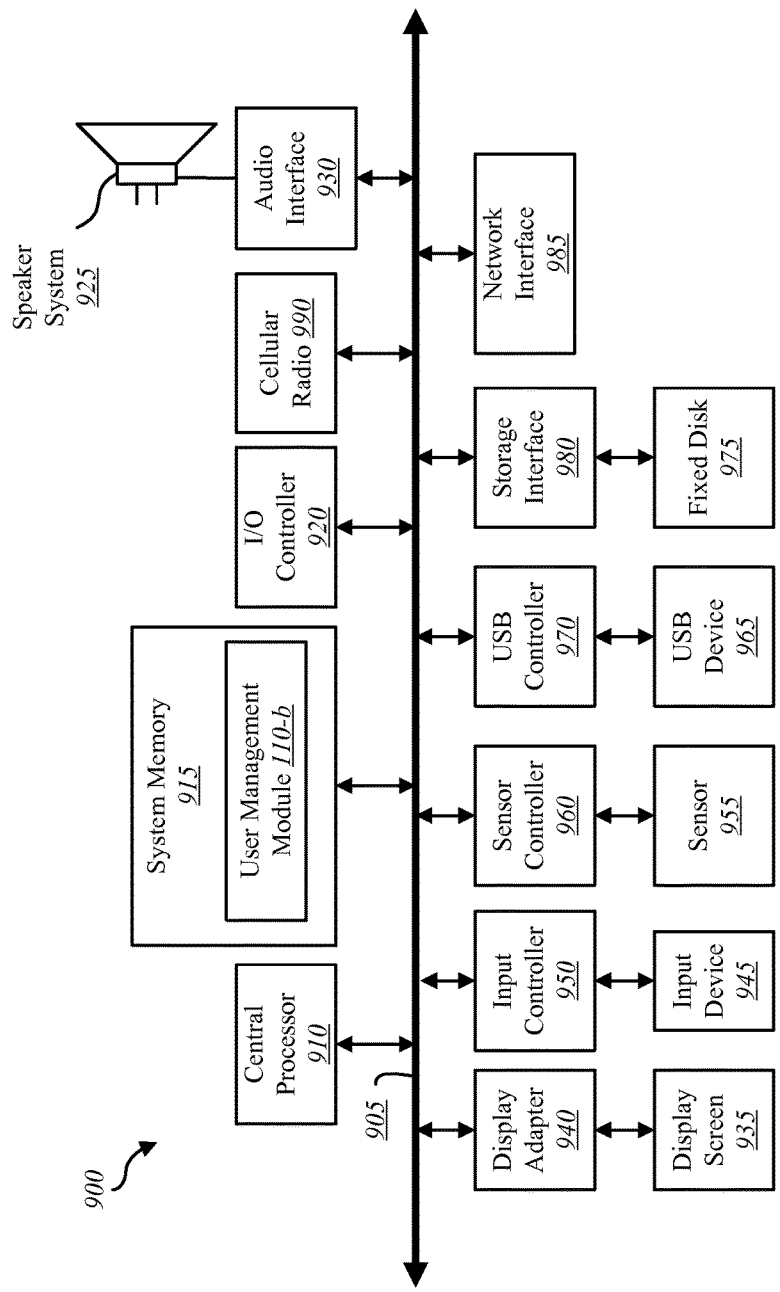
FIG. 11 is a block diagram of a computer system suitable for implementing the present systems and methods of FIGS. 1 and 2.

FIG. 11 depicts a block diagram of a controller 900 suitable for implementing the present systems and methods.

The controller 900 may be an example of the automation controller 225, the mobile computing device 235, and/or the personal computing device 240 illustrated in FIG. 2. In one configuration, the controller 900 may include a bus 905 which interconnects major subsystems of controller 900, such as a central processor 910, a system memory 915 (typically RAM, but which may also include ROM, flash RAM, or the like), an input/output controller 920, an external audio device, such as a speaker system 925 via an audio output interface 930, an external device, such as a display screen 935 via display adapter 940, an input device 945 (e.g., remote control device interfaced with an input controller 950), multiple USB devices 965 (interfaced with a USB controller 970), one or more cellular radios 990, and a storage interface 980. Also included are at least one sensor 955 connected to bus 905 through a sensor controller 960 and a network interface 985 (coupled directly to bus 905).

Bus 905 allows data communication between central processor 910 and system memory 915, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a user management module 110-b to implement the present systems and methods may be stored within the system memory 915. The user management module 110-b may be an example of the user management module 110 illustrated in FIGS. 1, 2, and/or 3. Applications (e.g., application 2) resident with controller 900 are generally stored on and accessed via a non-transitory computer readable medium, such as a hard disk drive (e.g., fixed disk 975) or other storage medium. Additionally, applications can be in the form of electronic signals modulated in accordance with the application and data communication technology when accessed via interface 985.

Storage interface 980, as with the other storage interfaces of controller 900, can connect to a standard computer readable medium for storage and/or retrieval of information, such as a fixed disk drive 975. Fixed disk drive 975 may be a part of controller 900 or may be separate and accessed through other interface systems. Network interface 985 may provide a direct connection to a remote server via a direct network link to the Internet via a POP (point of presence). Network interface 985 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 900 wirelessly via network interface 985. In one configuration, the cellular radio 990 may include a receiver and transmitter to wirelessly receive and transmit communications via, for example, a cellular network. The cellular radio 990 may be used to transmit information to the service station 210 via the network 205.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 11 need not be present to practice the present systems and methods. The devices and subsystems can be interconnected in different ways from that shown in FIG. 11. The aspect of some operations of a system such as that shown in FIG. 11 are readily known in the art and are not discussed in detail in this application. Code to implement the present disclosure can be stored in a non-transitory computer-readable medium such as one or more of system memory 915 or fixed disk 975. The operating system provided on controller 900 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for adding a user to an automation system, comprising:
   receiving, by a processor of the automation system, a request to add the user, wherein the request is generated from one of a computing device and an automation controller of the automation system;
   receiving, by the processor, contact information for the user;
   generating, by the processor, a message to send to the user, wherein the message includes an invitation to the automation system, the invitation to add an account associated with the user;
   sending, by the processor, the message to the user;
   adding, by the processor, in response to the user accepting the invitation, a user profile to the account, wherein the user profile is associated with a personalized access to control monitored property; and
   controlling, by the processor, a level of access to the automation system for different users by customizing a user interface based at least in part on adding the user profile to the account, wherein the customized user interface displays content that enables the user to control at least one physical zone of the monitored property based at least in part on the personalized access.

2. The computer-implemented method of claim 1, wherein the contact information is a mobile phone number and wherein the message is a SMS message.

3. The computer-implemented method of claim 1, further comprising:
   determining a type of computing device associated with the user based at least in part on the user accepting the invitation.

4. The computer-implemented method of claim 3, wherein determining the type of computing device further comprises determining that the type of computing device is a non-mobile computing device; and
   directing the user to a web browser module associated with the automation system based at least in part on determining that the type of computing device is the non-mobile computing device.

5. The computer-implemented method of claim 3, wherein determining the type of computing device further comprises determining that the type of computer device is a mobile computing device, the method further comprising:
   prompting the user to download a mobile application associated with the automation system to the mobile computing device.

6. The computer-implemented method of claim 1, wherein the contact information is an email address and wherein the message is an email.

7. The computer-implemented method of claim 1, further comprising:
   prompting the user to create an account with an automation system provider of the automation system; and
   prompting the user to create a profile associated with the automation system.

8. The computer-implemented method of claim 1, further comprising:
   receiving information from the user to generate the user profile for the automation system, wherein the information includes a unique identifier.

9. The computer-implemented method of claim 8, wherein the unique identifier is a numeric personal identification number.

10. The computer-implemented method of claim 8, wherein the unique identifier is a biometric identifier.

11. The computer-implemented method of claim 1, further comprising:
    sending a first message to an administrator, wherein the first message communicates an invitation was sent to the user; and
    sending a second message to the administrator, wherein the second message communicates a user profile was created.

12. The computer-implemented method of claim 1, wherein enabling the user to control an aspect of the monitored property further comprises allowing control of security, energy management, locking or unlocking a door, checking the status of a door, locating a person or an item, controlling lighting, controlling a thermostat, controlling a camera, receiving a notification a current status or anomaly associated with the monitored property, or any combination.

13. An apparatus for adding a user to an automation system, comprising:
    a processor;
    a memory in electronic communication with the processor; and
    instructions stored in the memory, the instructions being executable by a processor to:
      receive, by the processor of the automation system, a request to add the user, wherein the request is generated from one of a computing device and an automation controller of the automation system;
      receive, by the processor, contact information for the user;
      generate, by the processor, a message to send to the user, wherein the message includes an invitation to the automation system, the invitation to add an account associated with the user;
      send, by the processor, the message to the user; and
      add, by the processor, in response to the user accepting the invitation, a user profile to the account, wherein the user profile is associated with a personalized access to control monitored property; and
      control, by the processor, a level of access to the automation system for different users by customizing a user interface based at least in part on adding the user profile to the account, wherein the customized user interface displays content that enables the user to control at least one physical zone of the monitored property based at least in part on the personalized access.

14. The apparatus of claim 13, wherein the automation controller is a control panel.

15. The apparatus of claim 13, wherein the instructions are further executable to:
determine a type of computing device associated with the user based at least in part on the user accepting the invitation.

16. The apparatus of claim 15, wherein when the processor determines the type of computing device associated with the user, the instructions are further executable to determine the computing device is a smart phone comprising an application to interface with the automation system.

17. A computer-program product for adding a new user profile to an automation system, the computer-program product comprising a non-transitory computer-readable medium storing instructions executable by a processor to:
receive, by the processor of the automation system, a request to add a user, wherein the request is generated from one of a computing device and an automation controller of the automation system;
receive, by the processor, contact information for the user;
generate, by the processor, a message to send to the user, wherein the message includes an invitation to the automation system, the invitation to add an account associated with the user;
send, by the processor, the message to the user; and
add, by the processor, in response to the user accepting the invitation, a user profile to the account, wherein the user profile is associated with a personalized access to control the monitored property; and
control, by the processor, a level of access to the automation system for different users by customizing a user interface based at least in part on adding the user profile to the account, wherein the customized user interface displays content that enables the user to control at least one physical zone of the monitored property based at least in part on the personalized access.

18. The computer-program product of claim 17, wherein the automation controller is a control panel.

19. The computer-program product of claim 17, wherein the instructions are further executable to:
determine a type of computing device associated with the user based at least in part on the user accepting the invitation.

\* \* \* \* \*